(12) United States Patent
Raz et al.

(10) Patent No.: US 8,683,148 B2
(45) Date of Patent: Mar. 25, 2014

(54) STATUS INDICATION WHEN A MAINTENANCE OPERATION IS TO BE PERFORMED AT A MEMORY DEVICE

(75) Inventors: Moshe Raz, Kefar Rosh Hanikra (IL); Michael Fong, Edinburgh (GB)

(73) Assignee: Sandisk IL Ltd., Kfar Saba (IL)

( * ) Notice: Subject to any disclaimer, the term of this patent is extended or adjusted under 35 U.S.C. 154(b) by 592 days.

(21) Appl. No.: 12/827,867

(22) Filed: Jun. 30, 2010

(65) Prior Publication Data

US 2012/0005404 A1    Jan. 5, 2012

(51) Int. Cl.
*G06F 13/00* (2006.01)
*G06F 13/28* (2006.01)

(52) U.S. Cl.
USPC ..... 711/156; 711/103; 711/154; 711/E12.008

(58) Field of Classification Search
None
See application file for complete search history.

(56) References Cited

U.S. PATENT DOCUMENTS

| | | | |
|---|---|---|---|
| 5,603,001 A | 2/1997 | Sukegawa et al. | |
| 5,973,964 A | 10/1999 | Tobita et al. | |
| 6,603,680 B2 | 8/2003 | Kanamitsu et al. | |
| 6,735,121 B2 | 5/2004 | Yoshida | |
| 6,983,353 B2 | 1/2006 | Tamer et al. | |
| 7,089,349 B2 | 8/2006 | Chang et al. | |
| 7,315,917 B2 | 1/2008 | Bennett et al. | |
| 7,607,035 B2 | 10/2009 | Kano et al. | |
| 2003/0110361 A1 | 6/2003 | Kanehira et al. | |
| 2007/0033327 A1* | 2/2007 | Sinclair | 711/103 |
| 2007/0067828 A1 | 3/2007 | Bychov | |
| 2008/0010557 A1 | 1/2008 | Kume | |
| 2008/0052485 A1 | 2/2008 | Mosek | |
| 2008/0077923 A1 | 3/2008 | Mosek | |
| 2008/0086603 A1 | 4/2008 | Lahtinen et al. | |
| 2008/0126616 A1 | 5/2008 | Kumasawa et al. | |
| 2008/0282045 A1 | 11/2008 | Biswas et al. | |
| 2009/0106519 A1 | 4/2009 | Lin et al. | |
| 2009/0265508 A1 | 10/2009 | Bennett et al. | |
| 2010/0153672 A1 | 6/2010 | Jogand-Coulomb et al. | |

FOREIGN PATENT DOCUMENTS

| | | |
|---|---|---|
| WO | 2007019258 A2 | 2/2007 |
| WO | 2008015685 A2 | 2/2008 |
| WO | 2008015685 A3 | 2/2008 |
| WO | 2008019218 A2 | 2/2008 |

OTHER PUBLICATIONS

International Search Report and Written Opinion mailed Oct. 25, 2011 in International Application No. PCT/IB2011/001466, 10 pages.
Preliminary Amendment for U.S. Appl. No. 11/772,225 filed Jul. 23, 2007.
Preliminary Amendment for U.S. Appl. No. 11/772,226 filed Apr. 1, 2008.

* cited by examiner

*Primary Examiner* — Eric S Cardwell
(74) *Attorney, Agent, or Firm* — Toler Law Group, PC

(57) ABSTRACT

Data storage devices and methods are disclosed that provide a status indication when a maintenance operation is to be performed prior to completion of a write command. A method includes receiving a write command from a host device to write data to the non-volatile memory while the data storage device is operatively coupled to the host device. In response to determining that a maintenance operation is to be performed prior to the completion of the write command, an indication is sent to the host device that the write command has a status of incomplete.

20 Claims, 6 Drawing Sheets

STATUS INDICATION WHEN A MAINTENANCE OPERATION IS TO BE PERFORMED AT A MEMORY DEVICE

FIELD OF THE DISCLOSURE

The present disclosure is generally related to writing data in a data storage device.

BACKGROUND

Management of non-volatile memory devices such as flash memory devices may include performing maintenance operations at the memory. For example, "garbage collection" may be used to free portions of memory (e.g. blocks of a flash memory) for reuse. When a non-volatile memory device receives an instruction to write data to its memory and an insufficient amount of free memory is available to store the data, the memory device may perform a garbage collection operation prior to writing the data. However, performing garbage collection prior to writing the data may delay the completion of the data write until after a timeout period associated with the instruction has expired.

SUMMARY

Data storage devices and methods of operation determine whether a maintenance operation is to be performed prior to completion of a write command from a host device. If the maintenance operation is to be performed prior to the write command being completed, an indication is sent to indicate to a host device that the write command has a status of incomplete. Sending the indication to the host device can enable the data storage device to perform the maintenance operation without causing a timeout event at the host device.

DETAILED DESCRIPTION

A data storage device such as a flash memory card is configured to support a novel messaging or "handshake" with a host device. The flash memory card can signal to the host device that a write command is not completed, and in response the host device can resend the command. In addition, firmware within the flash memory card can implement an application programming interface (API) that enables the firmware to ask the flash management within the card whether a maintenance operation is required. When the flash management indicates that the maintenance operation is required, the firmware can use the time of the write command to perform the maintenance operations instead of committing the new data to memory and can indicate to the host device that the command is incomplete or can ask the host device to resend the write command. For example, the firmware can translate a received application command into a number of internal write commands and can query the flash management whether a maintenance operation is to be performed prior to completing the number of internal write commands to a specific address range.

Figure 1:
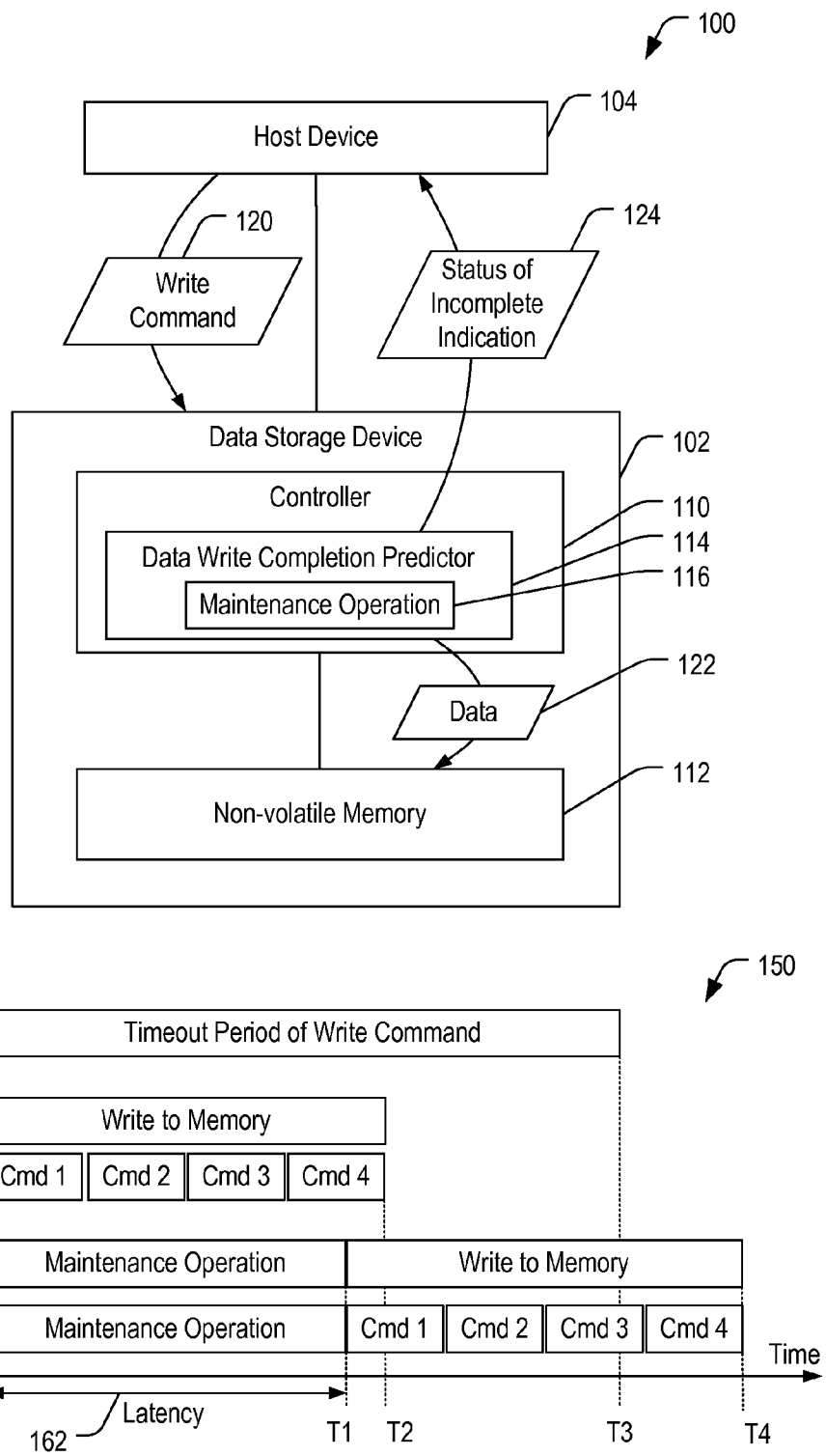
FIG. 1 is a general diagram of a particular embodiment of a data storage device configured to send an indication to a host device when a maintenance operation is to be performed prior to completion of a write command.

Referring to FIG. 1, a particular embodiment of a system is depicted and designated 100. The system 100 includes a data storage device 102 that is operatively coupled to a host device 104. The data storage device 102 is configured to determine whether a maintenance operation 116 is to be performed prior to completion of a write command 120. If the maintenance operation 116 is to be performed, the data storage device 102 is configured to send an indication 124 to the host device 104 showing a status of incomplete for the write command 120. Thus, a timeout period corresponding to the write command 120 may be prevented from expiring at the host device 104 when the data storage device 102 has to complete the maintenance operation 116 prior to completing the write command 120. For example, the host device 104 may stop a timer in response to receiving the indication 124.

The data storage device 102 includes the controller 110 coupled to a non-volatile memory 112. The controller 110 is configured to receive communications, such as a read command or the write command 120, from the host device 104 and to send status messages and data that is read from the non-volatile memory 112 to the host device 104.

The non-volatile memory 112 may be a flash memory. For example, the controller and the non-volatile memory 112 may be incorporated into one of removable flash memory cards, embedded flash memory, and a solid state drive. To illustrate, the data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be embedded memory in the host device 104, such as eMMC® (trademark of JEDEC Solid State Technology Association, Arlington, Va.) and eSD, as illustrative examples.

The controller 110 may be configured to manage the non-volatile memory 112. For example, the controller 110 may be configured to maintain a logical to physical address translation table, maintain a list of free blocks for use in the non-volatile memory, schedule and initiate maintenance operations such as garbage collection, or any combination thereof.

The controller 110 includes a data write completion predictor 114 that is configured to receive information indicating a size of data 122 to be written to the non-volatile memory 112 and to determine whether the data 122 can be written to the non-volatile memory 112 prior to expiration of a timeout period of the write command 120. For example, the data write completion predictor 114 may include logic implemented in dedicated circuitry or as program instructions executed by the controller 110. The data write completion predictor 114 may be configured to receive information indicating a size of the data 122 to be written to the non-volatile memory 112. Based on the size of the data 122, the data write completion predictor 114 may be configured to determine whether the data 122 can be written to the non-volatile memory 112 or whether a maintenance operation is to be performed prior to completion of writing the data 122. The data write completion predictor 114 may be implemented in an application module of the controller 110 that is configured to communicate with a memory management module of the controller 110, such as described with respect to FIG. 5.

The controller 110 is configured to selectively send the indication 124 while the data storage device 102 is operatively coupled to the host device 104. For example, the controller 110 may be responsive to the data write completion predictor 114 to send the indication 124 in response to a prediction that execution of the write command 120 will not complete before a timeout period expires. The indication 124 may indicate that the write command 120 received from the host device 104 has a status of incomplete when the maintenance operation 116 is to be performed at the non-volatile memory 112 prior to completion of the write command 120.

During operation, the data storage device 102 may receive the write command 120 from the host device 104 to write the data 122 to the non-volatile memory 112. Prior to initiating a data write to the non-volatile memory 112, the data write completion predictor 114 of the controller 110 may determine whether the maintenance operation 116 is to be performed at the non-volatile memory 112. For example, the maintenance operation 116 may be a garbage collection operation that frees memory space at the non-volatile memory 112. When a length of the data 122 exceeds an available free memory capacity of the writable available memory at the non-volatile memory 112, the garbage collection operation may be performed at the non-volatile memory 112 to free sufficient amount of memory to enable writing of the data 122.

In response to the data write completion predictor 114 determining that the maintenance operation 116 is not to be performed, the controller 110 directs writing of the data 122 to the non-volatile memory 112. Alternatively, when the data write completion predictor 114 determines that the maintenance operation 116 is to be performed at the non-volatile memory 112, the controller 110 sends the indication 124 to the host device 104 to indicate the write command 120 has a status of incomplete. For example, the controller 110 may send the indication 124 before the maintenance operation 116 begins, during the maintenance operation 116, in response to the maintenance operation 116 completing, or at a later time prior to expiration of the timeout period. To illustrate, the data storage device 110 may implement a timer to send the indication 124 in response to a predetermined period of time elapsing after the write command 120 is received. The predetermined period of time may be set so that the host device 104 receives the indication 124 immediately prior to expiration of the timeout period.

The data storage device 102 may perform the maintenance operation 116 at the non-volatile memory 112 and the host device 104 may receive the indication 124. The host device 104 may re-send the write command 120 or may send another write command to write the data 122 to the non-volatile memory 112. In some implementations, the data storage device 102 may partially execute the command 120 and may send one type of the indication 124 to indicate that the command 120 is incomplete but partially performed. The host device 104 may be required to continue resending the command 120 until the data storage device 102 completes execution of the command 120. In other implementations, the data storage device 102 may not execute any portion of the command 120 and may send another type of the indication 124 to indicate that the command 120 was not performed (i.e. none of the data 122 has been written to the non-volatile memory 112). The host device 104 may decide whether to resend the command 120 after receiving the indication 124. Upon receiving a second write command to write the data 122, such as by the host 104 re-sending the write command 120 after receiving the indication 124, the data storage device 102 may be able to store the data 122 to the non-volatile memory 112 within the timeout period associated with the write command 120.

A timing diagram 150 illustrates examples of timing information during operation of the data storage device 102. The timing diagram 150 includes timing information for a timeout period 152 of the write command 120. As illustrated, the timeout period 152 begins at time T0 and ends at time T3. The timeout period 152 indicates a maximum amount of delay that the host device 104 will accept after sending the write command 120 and prior to receiving a response from the data storage device 102. For example, the host device 104 may start a timeout clock upon sending the write command 120, and if the host device 104 does not receive a response from the data storage device 102 prior to the end of the timeout period 152 the host device 104 may determine that the data storage device 102 is non-responsive or otherwise inoperable.

A first sequence of operations 154 illustrates an amount of time that elapses for the data storage device 102 to perform a write of the data 122 to the non-volatile memory 112 after receiving the write command 120, when the maintenance operation 114 is not to be performed. As illustrated, the write to memory operation begins at time T0 and completes at time T2 before the end of the timeout period 152. Thus, the write to memory operation may be safely completed before expiration of the timeout period 152 when the maintenance operation 116 is not to be performed. Alternatively, a second sequence of operations 156 illustrates that writing the data 122 to the non-volatile memory 112 can be performed as a series of internal commands, illustrated as command 1-command 4. For example, the write command 120 may indicate a data length that exceeds a data length limit for individual writes from the controller 110 to the non-volatile memory 112. The controller 110 may execute an application to divide the write command 120 into multiple internal commands that may all be performed during a time period prior to expiration of the timeout period 152.

A third sequence of operations 158 illustrates an example where the maintenance operation 116 is to be performed prior to writing the data 122 to the non-volatile memory 112. A latency 162 of the maintenance operation 116 extends from the time T0 to a time T1. Following the end of the maintenance operation at time T1, a write operation to write the data 122 to the non-volatile memory 112 is initiated. However, the write operation does not complete until the time T4, after the timeout period 152 expires. Thus, if the controller 110 were to perform the maintenance operation 116 followed by a write operation to write the data 122 to the non-volatile memory 112, the host device 104 would recognize a timeout of the write command 120, and the host device 104 may re-send the write command 120 or may cease communication with the data storage device 102, even though the write command 120 may be successfully completed after the end of the timeout period 152.

A fourth sequence of operations 160 illustrates another alternative where the maintenance operation 116 is to be performed prior to storing the data 122 at the non-volatile memory 112. The maintenance operation 116 has the latency 162 extending from time T0 to time T1 and is followed by performing the data write as the series of internal commands (command 1-command 4). As illustrated, the data 122 may be partially written to the memory array, as command 1 and command 2 are completed prior to the timeout period 152 at time T3. However, command 3 and command 4 are not completed prior to the timeout period 152 and are not completed until time T4, following the end of the timeout period 152.

As a result, the data storage device 102 may send the indication 124 when an estimated amount of time for completing the write command, such as the time from T3 to T4, exceeds the timeout period 152 associated with the write command 120. When the maintenance operation 116 is to be performed at the non-volatile memory 112 prior to completion of the write command 120, the estimated amount of time includes the latency 162 corresponding to the maintenance operation 116 and also includes the latency of one or more write operations to the non-volatile memory 112. Although in some embodiments the data storage device 102 may estimate an amount of time to complete the write command, in other embodiments the data storage device 102 does not estimate the amount of time and instead sends the indication 124 in response to determining that the maintenance operation 116 is to be performed prior to completion of the write command 120.

In an implementation where the controller 110 writes the data 120 in a single operation, the controller 110 may initiate the maintenance operation 116 and send the indication without initiating the write of the data 122 to the non-volatile memory 112 to avoid the timeout period expiring as illustrated in the third sequence of operations 158. In another implementation where the controller 110 is configured to translate the write command 120 into multiple internal commands, such as command 1-command 4 of the fourth sequence of operations 160, a portion of the multiple internal commands may be completed prior to expiration of the timeout period 152 associated with write command 120. After completing the maintenance operation 116, the controller 110 may complete command 1 and command 2 and may not perform command 3 and command 4. As a result, a portion of the data 122 is written to the non-volatile memory 112 while another portion is not written to the non-volatile memory 112. The indication 124 sent to the host device 104 indicates that the write command 120 has a status of incomplete.

Whether the controller 110 is configured to write the data 122 in a single operation or via multiple internal commands, when the maintenance operation 116 is to be performed, the data 122 is not completely stored in the non-volatile memory 112. As a result, either no data is written to the non-volatile memory 112 or only partial data is written to the non-volatile memory 112. However, by sending the indication 124 to the host device 104 prior to expiration of the time-out period 152, the data storage device 102 can complete the maintenance operation 116 while complying with a requirement of the host device 104 to respond to the write command 120 during the timeout period 152.

Figure 2:
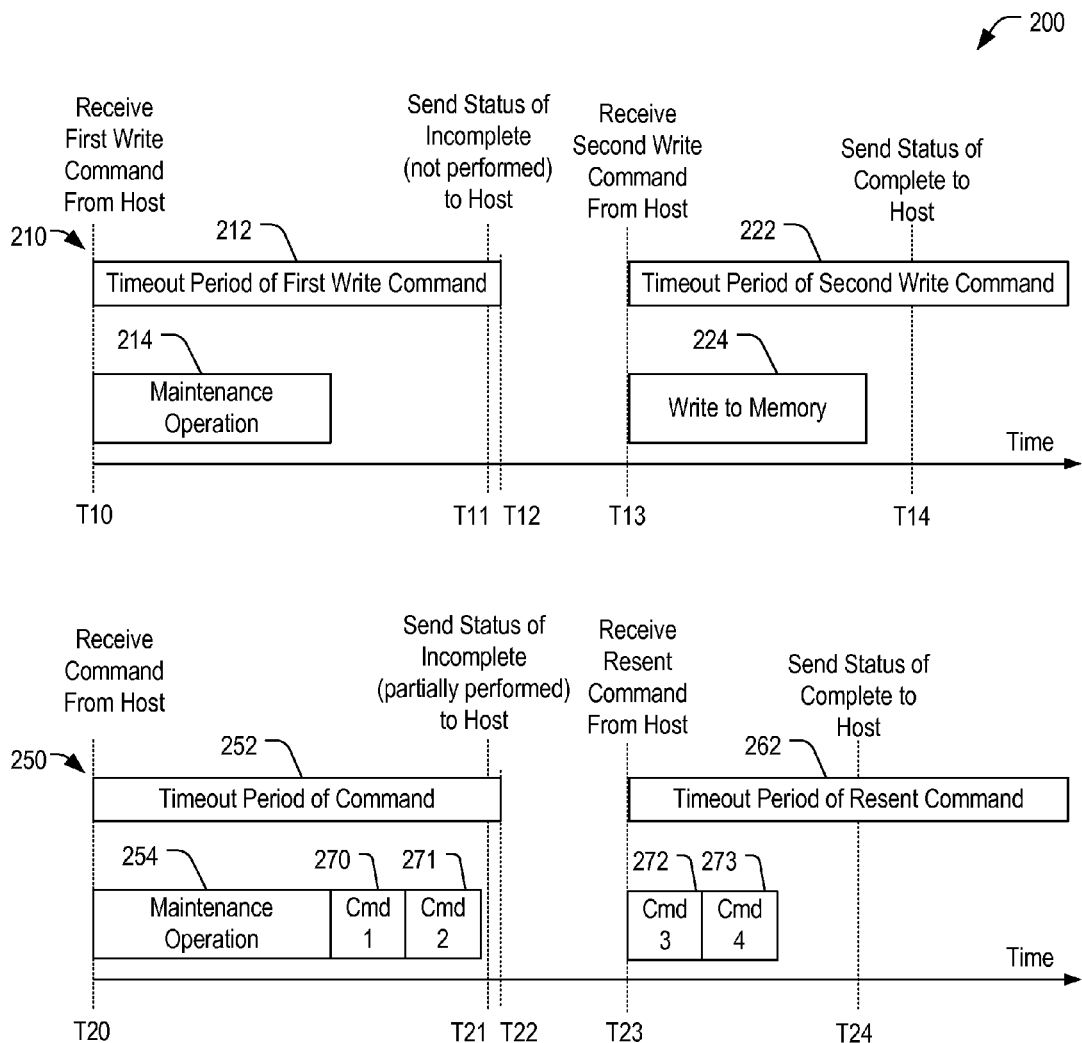
FIG. 2 is a timing diagram of a particular embodiment of sending an indication to a host device when a maintenance operation is to be performed prior to completion of a write command.

Referring to FIG. 2, timing diagram illustrating examples of sending an indication to a host device when a maintenance operation is to be performed prior to completion of a received command at a data storage device is depicted and generally designated 200. The data storage device may be the data storage device 102 in communication with the host device 104 of FIG. 1.

A first example 210 illustrates timing in an embodiment where the data storage device receives a first write command from a host to write data to a memory, at time T10. In response to determining that a maintenance operation 214 is to be performed prior to writing the data to the memory, the data storage device performs the maintenance operation 214 during a timeout period 212 of the first write command without writing any of the data to the memory.

The data storage device sends an indication to the host that the first write command has a status of incomplete, at time T11, prior to the end of the timeout period 212 of the first write command at time T12. The indication may be a first type of indication that signals to the host that the write command was not performed (i.e. no data has been written). In response, the host may have a choice of whether to resend the write command.

The data storage device may receive a second write command from the host at time T13. The second write command may instruct the data storage device to write the same data as the first write command or to write other data. In response to receiving the second write command, the data storage device may determine whether a maintenance operation is to be performed prior to writing the data to the memory. Because the maintenance operation 214 was performed during the timeout period 212 of the first write instruction, a write operation 224 may be completed before the end of a second timeout period 222 of the second write command without requiring another maintenance operation. The data storage device sends an indication to the host that the second write command has a status of complete, at time T14, prior to the end of the second timeout period 222.

A second example 250 illustrates timing in an embodiment where the data storage device receives a command from a host, at time T20, and translates the command into multiple internal commands, illustrated as a first command 270, a second command 271, a third command 272, and a fourth command 273. In response to determining that a maintenance operation 254 is to be performed, the data storage device performs the maintenance operation 254 during a timeout period 252 of the command and also completes the first and second internal commands 270 and 271 prior to expiration of the timeout period 252.

The data storage device sends an indication to the host that the first write command has a status of incomplete, at time T21, prior to the end of the timeout period 252 at time T22. The indication may be a second type of indication that signals to the host that the command was partially performed (i.e. part but not all of the multiple internal commands 270-273 have been completed). The host may be required to respond to the second type of indication by resending the command to provide additional time for completion of the command.

The data storage device receives the resent command from the host at time T23. In response to receiving the resent command, the data storage device may determine whether a maintenance operation is to be performed prior to completing the remaining internal commands 272-273. Because the maintenance operation 254 was performed during the timeout period 252, the remaining internal commands 272-273 may be completed before expiration of a timeout period 262 of the resent command without requiring another maintenance operation. After completing execution of all of the internal commands 270-273, the data storage device sends an indication to the host that the command has a status of complete, at time T24, prior to the end of the timeout period 262.

Although the second example 250 illustrates that the received command is translated into four internal commands 270-273, in other embodiment the received command may be translated into fewer than four internal commands or may be translated into five or more internal commands. The data storage device may send the second type of indication (i.e.

indicating the command is partially performed) at the end of each successive timeout period while any of the internal commands remain uncompleted, and the host may be programmed to respond by again resending the command. In this manner, the data storage device may be provided a sufficient amount of time via multiple successive timeout periods to perform the received command.

Figure 3:
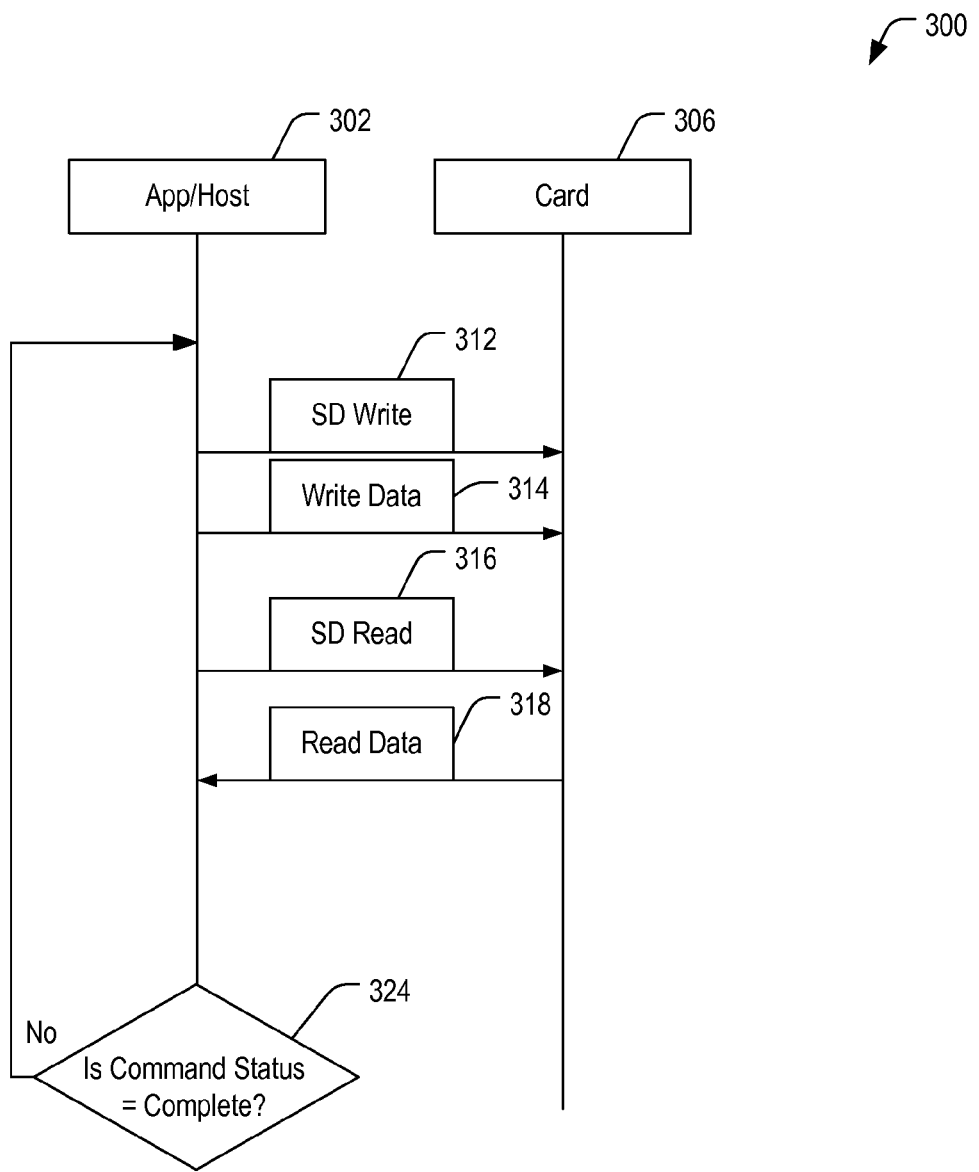
FIG. 3 is a ladder diagram of a first particular embodiment of messaging that provides an indication to a host device when a maintenance operation is to be performed prior to completion of a write command.
Figure 4:
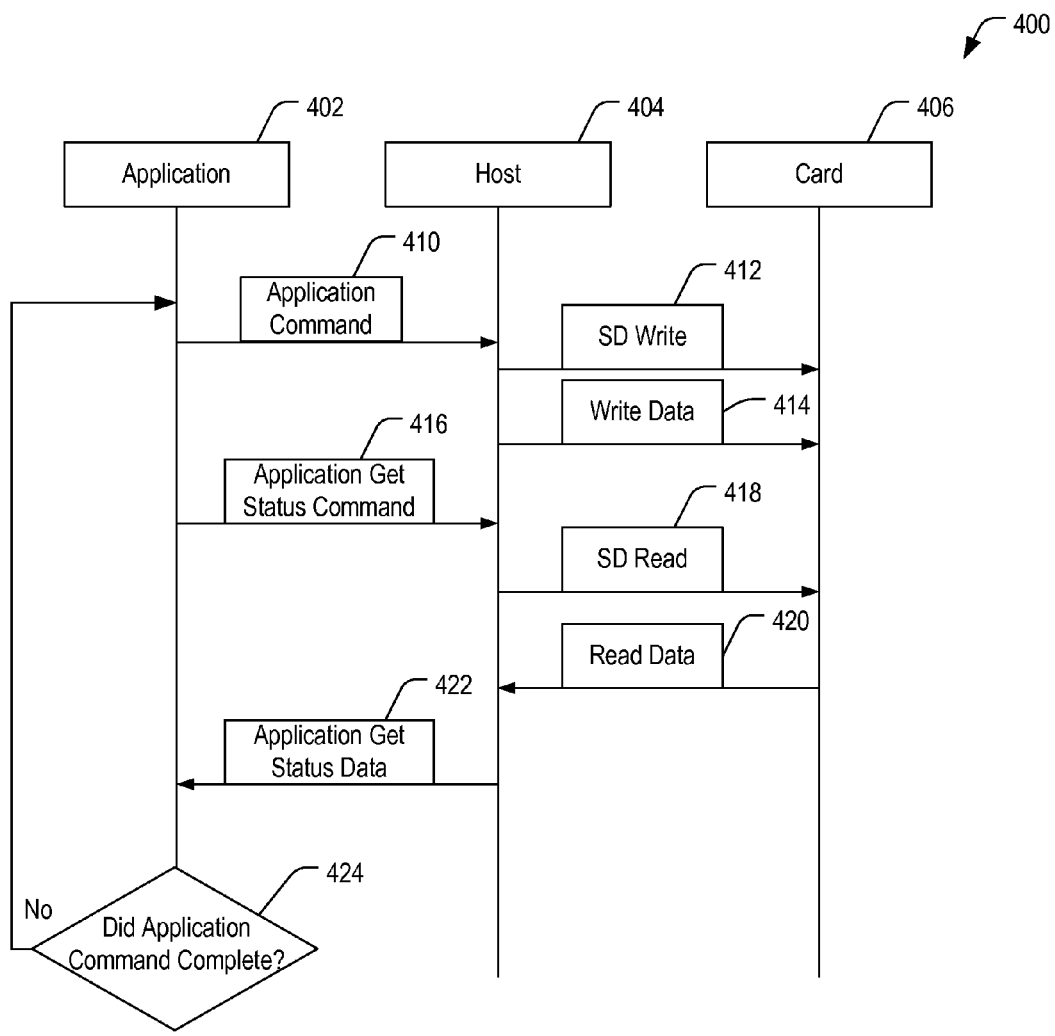
FIG. 4 is a ladder diagram of a second particular embodiment of messaging that provides an indication to a host device when a maintenance operation is to be performed prior to completion of a write command.
Figure 5:
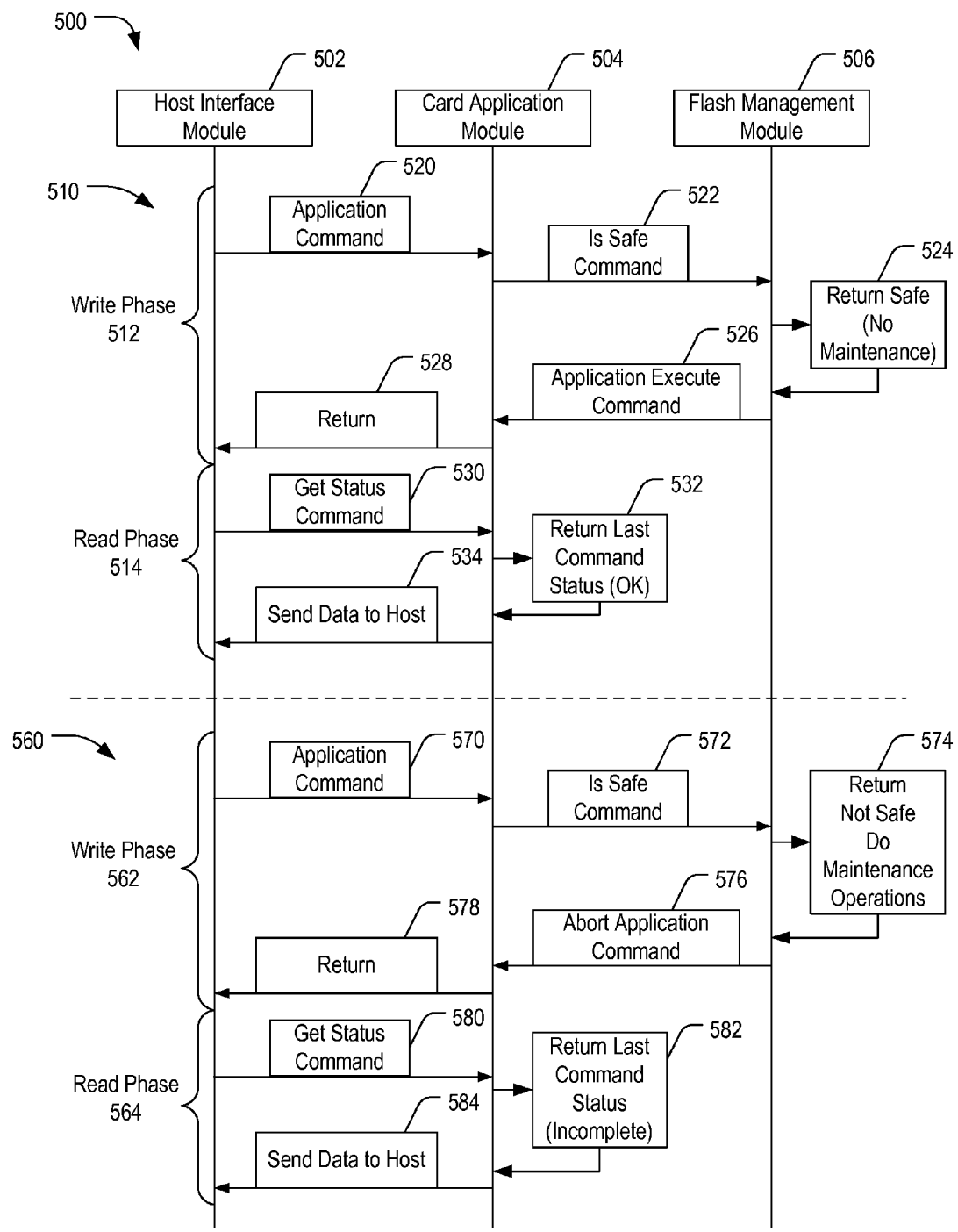
FIG. 5 is a ladder diagram of a third particular embodiment of messaging that provides an indication to a host device when a maintenance operation is to be performed prior to completion of a write command.

Determining whether the maintenance operation is to be performed and sending the indication can be implemented at different protocol layers, as illustrated in FIGS. 3-5. In FIG. 3, a memory card is illustrated that can receive a Secure Digital (SD) command of a write type and can respond with a Command_Incomplete response. In FIG. 4, another protocol over SD can use the data payload of the SD write and read commands to implement another protocol layer. An SD write command may be sent to a memory card to execute the protocol command and a SD read command may be used to retrieve SD read data that indicates a Command_Incomplete status response code. In FIG. 5, firmware within a memory card can be executable by a controller to obtain an indication of whether a memory maintenance is about to occur. Although FIGS. 3-5 illustrate implementations using SD commands, in other implementations other protocols may be used.

Referring to FIG. 3, a ladder diagram illustrating a particular embodiment of messaging is depicted and designated 300. The messaging 300 includes commands and data communicated between a card 306 and an application at a host or the host itself (referred to as app/host 302). For example, the app/host 302 can correspond to the host device 104 of FIG. 1 and the card 306 can be a flash memory card that corresponds to the data storage device 102 of FIG. 1.

The app/host 302 sends a write command 312 and write data 314 to the card 306. For example, the write command 312 may be a Secure Digital (SD) write command. The app/host 302 also sends a read command 316 to the card 306. For example, the read command 316 may be an SD read command that is configured to read status information corresponding to the previous instruction (i.e. the write command 312). The card 306 may receive the read command 316 and in response may return read data 318 to the app/host 302.

The app/host 302 may receive the read data 318 and in response may determine whether the write command 312 completed, at decision 324. For example, when the read data 318 includes an indication that the write command 312 has a status of incomplete, processing may return to the write command 312 being re-sent to the card 306. The indication of the status of incomplete may include a value of a status bit in an SD response message.

As a result, the card 306 may inform the application/host 302 that data to be written to the card 306 will not be completed within a timeout period of the write command 312, and therefore an indication of an incomplete status of the write command 312 is sent from the card 306 to the app/host 302. In response, the app/host 302 may re-send the command 312 after receiving the indication.

Referring to FIG. 4, a ladder diagram illustrating a particular embodiment of messaging is depicted and designated 400. The messaging 400 includes commands and data communicated between an application 402, such as an application running at the host device 104 of FIG. 1, and a host 404, such as the host device 104. The messaging 400 also includes commands and data communicated between the host 404 and a card 406 that includes a memory array for storing data. For example, the card 406 may be a flash memory card and may correspond to the data storage device 102 of FIG. 1.

The application 402 sends an application command 410 to the host 404. For example, the application command 410 may be a command to write data, such as the write command 120 of FIG. 1. The host 404 receives the application command 410 and in response sends a write command 412 and write data 414 to the card 406. For example, the write command 412 may be a Secure Digital (SD) write.

The application 402 also sends an application get status command 416 to the host 404. The host 404 receives the application get status command 416 and in response sends a read command 418 to the card 406. For example, the read command 418 may be an SD read command that is configured to read status information corresponding to the previous instruction (in this case the write command 412). The card 406 may receive the read command 418 and in response may return read data 420 to the host 404. The host 404 may receive the read data 420 and in response may send application get status data 422 to the application 402 as a response to the get status command 416.

The application 402 may receive the application get status data 422 and may determine whether the application command 410 completed, at decision 424. For example, when the application get status data 422 indicates that the application command 410 is incomplete, or has a status of incomplete, processing may return to the application command 410 being sent to the host 404.

Thus, the host 404 may translate the application command 410 to the write command 412 that is provided to the card 406. The host 404 may also translate the application get status command 416 to the read command 418 and may interpret the read data 420 to generate the application get status return data 422 that is sent to the application 402. To illustrate, a controller of the card 406, such as the controller 110 of FIG. 1, may be configured to send an indication to the host device 404 via a secure digital (SD) response message in the read data 420. For example, the indication may include a value of a status bit in the SD response message.

As a result, the card 406 may inform the host 404 that data to be written to the card 406 will not be completed within a timeout period of the application command 410, and therefore an indication of an incomplete status of the write command 412 is sent from the card 406 to the host 404. In response, the host 404 indicates to the application 402 the incomplete status. The application 402 may re-send the command 410 after receiving the incomplete status data 422.

Referring to FIG. 5, an illustrative embodiment of internal messaging is illustrated and designated 500. A host interface module 502, a card application module 504, and a flash management module 506 are illustrated. For example, the modules 502-506 may be implemented in the controller 110 of FIG. 1. The host interface module 502 may be configured to enable communications with the host device 104 of FIG. 1. The host interface module 502 may further be configured to communicate commands and data with the card application module 504, with the flash management module 506, or a combination thereof.

The card application module 504 may be configured to execute one or more applications, such as a security application. For example, the card application module 504 may implement a security application that enables division of a flash memory space into several partitions and provides enforcement of read and write permission to individual partitions. The security application may enable configuration of sets of permissions for each authenticated entity accessing a flash memory and validate every received service request against registered rights for the requesting entity. As a specific example, the security application may be a TrustedFlash® application (TrustedFlash is a trademark of SanDisk Corporation, Milpitas, Calif.). For example, the TrustedFlash application may establish one or more TrustedFlash sessions including a write phase followed by a read phase. The TrustedFlash session may be configured to enable secure access to the flash memory and to enable communication with the flash management module 506.

The flash management module 506 may be configured to perform management operations to a non-volatile memory such as the non-volatile memory 112 of FIG. 1. To illustrate, the flash management module 506 may include functionality such as logical to physical address translation, maintain a list of one or more free blocks for use in the non-volatile memory, and scheduling and initiating maintenance operations, such as garbage collection or wear leveling.

In a first example 510, a session (e.g. a TrustedFlash session) is illustrated that includes a write phase 512 and a read phase 514. During the write phase 512, the host interface module 502 sends an application command 520 that is received by the card application module 504. In response, the card application module 504 sends an is safe command 522 to the flash management module 506. In response to receiving the is safe command 522 from the card application module 504, the flash management module 506 determines whether or not a maintenance operation is to be performed at a non-volatile memory prior to completing the application command 520. For example, the application command 520 may be the write command 120 of FIG. 1 and the maintenance operation may be the maintenance operation 116 of FIG. 1. In the first example 510, the flash management module 506 determines that no maintenance is to be performed prior to implementing the application command 520, and returns a safe indication 524.

In response to the return safe indication 524, the flash management module 506 sends an application execute command 526 to the card application module 504. In response to receiving the application execute command 526, the card application module 504 executes the application command 520, such as storing data to the flash memory, and provides return data 528 to the host interface module 502.

During the read phase 514 following the write phase 512, the host interface module 502 sends a gets status command 530 to the card application module 504. The card application module 504 returns a last command status 532, which in the first example 510 is a completed command status because no maintenance operation was performed prior to executing the application command 520. The card application module 504 sends data to the host via an instruction 534 to indicate to the host that the application command 520 was completed successfully.

A second example 560 includes a write phase 562 and a read phase 564. During the write phase 562, an application command 570 is provided by the host interface module 502 and received at the card application module 504. In response to receiving the application command 570, the card application module 504 sends an is safe command 572 to the flash management module 506.

In response to receiving the is safe command 572, the flash management module 506 determines whether or not one or more maintenance operations are to be performed at the non-volatile memory prior to completion of the application command 570. As illustrated in the second example 560, one or more maintenance operations, such as garbage collection, are to be performed prior to completion of the application command 570. As a result, a not safe result 574 is returned and the one or more maintenance operations are initiated.

In response to the returned not safe result 574 and initiation of the one or more maintenance operations, the flash management module 506 sends an abort application command 576 to the card application module 504. In response to receiving the abort application command 576, the card application module 504 does not complete the application command 570 and provides return data 578 to the host interface module 502.

During the read phase 564, the host interface module 502 sends a get status command 580 to the card application module 504. In response to receiving the get status command 580, the card application module 504 returns a last command status 582, which includes a status of incomplete. For example, the application command 570 was indicated as not being safely performed due to the one or more maintenance operations indicated by the flash management module 506 as to be performed prior to completion of execution of the application command 570. As a result, when the host interface module 502 sends the gets status command 580, an incomplete status is returned as the last command status via an instruction 584 to send data to the host.

Figure 6:
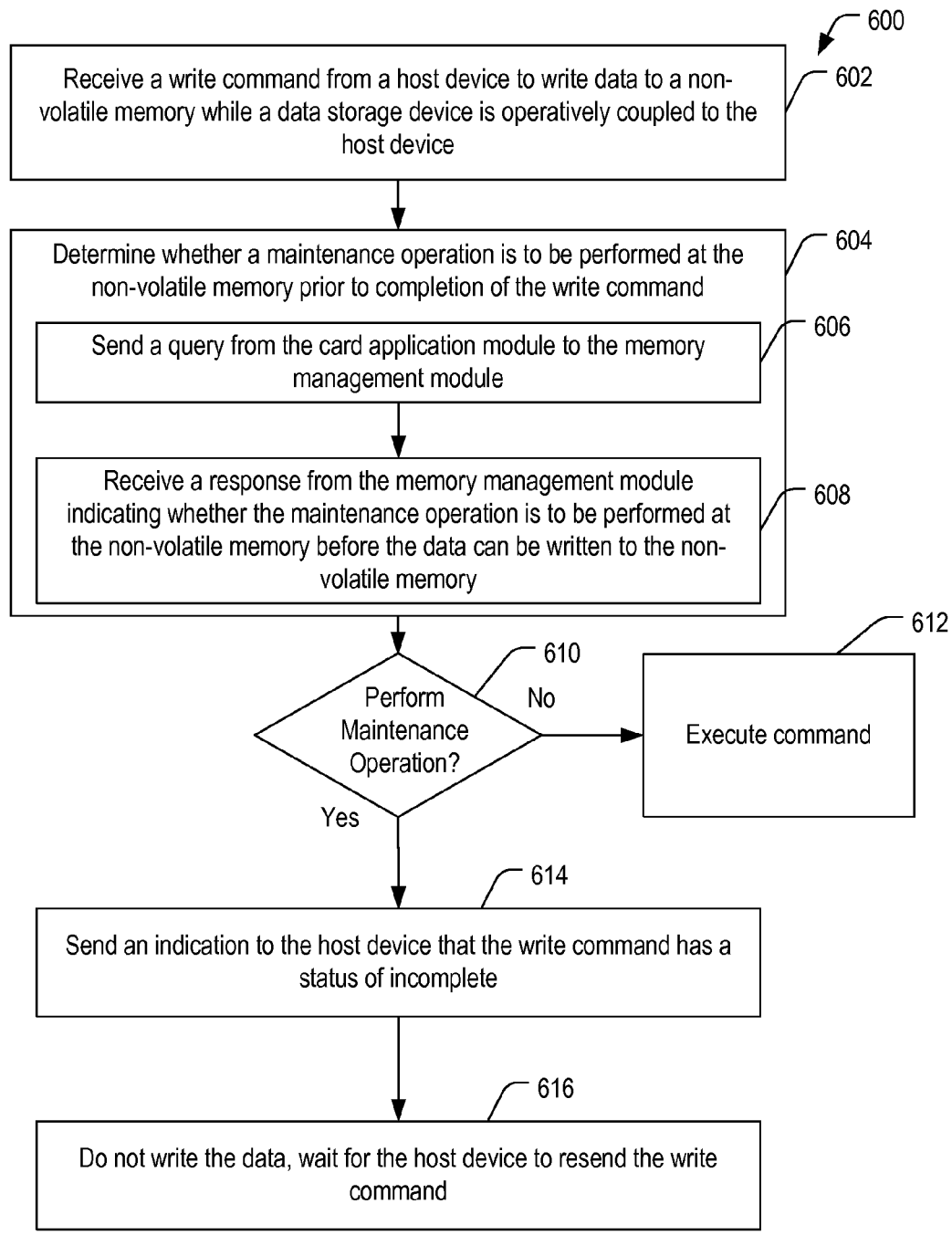
FIG. 6 is a flow chart of a particular embodiment of a method that includes providing an indication to a host device when a maintenance operation is to be performed prior to completion of a write command.

FIG. 6 is a flow chart of a particular embodiment of a method 600 that includes providing an indication to a host device when a maintenance operation is to be performed prior to completion of a write command. The method 600 may be performed in a data storage device with a non-volatile memory, such as the data storage device 102 of FIG. 1. The method 600 includes receiving a write command from a host device to write data to the non-volatile memory while the data storage device is operatively coupled to the host device, at 602. Although FIG. 6 illustrates receiving a write command from the host device, in other embodiments an application command may instead be received from the host device, such as the application command 520 of FIG. 5.

The method 600 includes determining whether a maintenance operation is to be performed at the non-volatile memory prior to completion of the write command, at 604. To illustrate, the maintenance operation may be a garbage collection operation to be performed to free sufficient space of the non-volatile memory to write the data. For example, in an implementation where the data storage device includes a controller with a card application module and a memory management module, such as the card application module 504 and the flash management module 506 of FIG. 5, determining whether the maintenance operation is to be performed may include sending a query from the card application module to the memory management module, at 606. A response may be received from the memory management module indicating whether the maintenance operation is to be performed at the non-volatile memory before the data can be written to the non-volatile memory, at 608.

The indication may be sent when an estimated amount of time for completing the write command exceeds a timeout period associated with the write command, such as illustrated by the timeout period 152 of FIG. 1. When the maintenance operation is to be performed at the non-volatile memory prior to completion of the write command, the estimated amount of time for completing the write command includes a latency corresponding to the maintenance operation. For example, the third sequence of operations 158 of FIG. 1 exceeds the timeout period 152 and includes the latency 162 of the maintenance operation 116.

In response to determining that no maintenance operation will be performed prior to the completion of the write command, at 610, the data may be written to the non-volatile memory, at 612. Alternatively, in an embodiment where the data storage device receives an application command from the host device instead of receiving the write command, the application command may be executed at 612.

In response to determining that the maintenance operation is to be performed prior to the completion of the write command, at 610, an indication is sent to the host device that the write command has a status of incomplete, at 614. In a particular embodiment, such as illustrated in FIG. 3 and FIG. 4, the indication is sent to the host device via a Secure Digital (SD) response message. For example, the indication may include a value of a status bit in the Secure Digital (SD) response message. In another particular embodiment, such as illustrated in FIG. 5, a get status command is received after receiving the write command, and the indication may be sent to the host device in response to a result of the get status command. For example, the get status command and the result may be received during a read phase of a TrustedFlash session.

The data storage device may perform the maintenance operation and may not write the data, at 616. Instead, the data storage device may wait for the host device to resend the write command after the host device receives the indication. For example, after sending the indication, a second write command may be received from the host device to write the data to the non-volatile memory, such as illustrated in the first example 210 of FIG. 2.

Alternatively, instead of waiting for the host device to resend the write command without writing the data, at 616, the data storage device may perform the maintenance operation and may translate the received command into multiple internal commands, such as the commands 270-273 of the second example 250 of FIG. 2. A portion of the internal commands may be completed prior to expiration of a timeout period associated with the received command. To illustrate, the commands 270-271 of FIG. 2 are completed prior to expiration of the timeout period 252. The data storage device may send the indication that the command has the status of incomplete, but partially performed, as described with respect to FIG. 2. The host device may continue resending the command in response to each received incomplete status indicator until all of the internal commands have been completed, such as illustrated in the second example 250 of FIG. 2.

Although various components depicted herein are illustrated as block components and described in general terms, such components may include one or more microprocessors, state machines, or other circuits configured to enable the data storage device 102 to perform the particular functions attributed to such components, or any combination thereof. For example, the data write completion predictor 114 may represent one or more physical components, such as hardware controllers, state machines, logic circuits, or other structures to enable the data storage device 102 of FIG. 1 to determine whether the maintenance operation 116 is to be performed prior to writing the data 122.

In a particular embodiment, the data storage device 102 may be a portable device configured to be selectively coupled to one or more external devices. However, in other embodiments, the data storage device 102 may be attached or embedded within one or more host devices, such as within a housing of a portable communication device. For example, the data storage device 102 may be within a packaged apparatus such as a wireless telephone, a personal digital assistant (PDA), gaming device or console, a portable navigation device, or other device that uses internal non-volatile memory. In a particular embodiment, the data storage device 102 includes a non-volatile memory, such as a flash memory (e.g., NAND, NOR, Multi-Level Cell (MLC), Divided bit-line NOR (DI-NOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of responding to a write command, the method comprising:
   in a data storage device with a non-volatile memory, performing:
   receiving a write command to write data to the non-volatile memory;
   determining whether a maintenance operation is to be performed at the non-volatile memory prior to completion of the write command;
   starting the maintenance operation in response to determining that the maintenance operation is to be performed prior to the completion of the write command;
   receiving a get status command after receiving the write command and prior to the completion of the write command; and
   sending an indication in response to the get status command that the write command has a status of incomplete.

2. The method of claim 1, wherein the data storage device includes a controller with a card application module and a memory management module, and wherein determining whether the maintenance operation is to be performed includes:
   sending a query from the card application module to the memory management module; and
   receiving a response from the memory management module indicating whether the maintenance operation is to be performed at the non-volatile memory before the data can be written to the non-volatile memory.

3. The method of claim 1, wherein the maintenance operation is a garbage collection operation.

4. The method of claim 1, wherein the indication is sent via a Secure Digital (SD) response message.

5. The method of claim 4, wherein the indication includes a value of a status bit in the Secure Digital (SD) response message.

6. The method of claim 1, wherein the indication is sent before expiration of a timeout period associated with the write command.

7. The method of claim 6, wherein the get status command is received during a read phase of a TrustedFlash session.

8. The method of claim 1, further comprising, after sending the indication, receiving a second write command to write the data to the non-volatile memory.

9. The method of claim 6, wherein the indication is sent when an estimated amount of time for completing the write command exceeds the timeout period associated with the write command and wherein, when the maintenance operation is to be performed at the non-volatile memory prior to completion of the write command, the estimated amount of time includes a latency corresponding to the maintenance operation.

10. The method of claim 1, further comprising:
   translating the write command into multiple internal commands; and
   completing a portion of the internal commands prior to expiration of a timeout period associated with the write command.

11. A data storage device comprising:
   a non-volatile memory; and
   a controller coupled to the non-volatile memory, wherein the controller is configured to receive a write command and in response to determining that a maintenance operation is to be performed at the non-volatile memory prior to completion of the write command, to start the maintenance operation, wherein the controller is further configured, in response to receiving a get status command after receiving the write command and prior to completion of the write command, to send an indication that the write command has a status of incomplete.

12. The data storage device of claim 11, wherein the controller includes a card application module and a memory management module, wherein the card application module is configured to send a query to the memory management module, and wherein the memory management module is configured to send a response to the card application module, the response indicating whether the maintenance operation is to be performed before the data can be written to the non-volatile memory.

13. The data storage device of claim 12, further comprising a host interface module, wherein the host interface module is configured to send the get status command to the card application module and to send the indication to a host device in response to receiving a result of the get status command from the card application module.

14. The data storage device of claim 13, wherein the host interface module sends the get status command and receives the result of the get status command during a read phase of a TrustedFlash session.

15. The data storage device of claim 11, wherein the maintenance operation is a garbage collection operation.

16. The data storage device of claim 11, wherein the controller is configured to send the indication via a Secure Digital (SD) response message.

17. The data storage device of claim 16, wherein the indication includes a value of a status bit in the Secure Digital (SD) response message.

18. The data storage device of claim 11, wherein the indication is sent further in response to an estimated amount of time for completing the write command exceeding a timeout period associated with the write command and wherein, when the maintenance operation is to be performed at the non-volatile memory prior to completion of the write command, the estimated amount of time includes a latency corresponding to the maintenance operation.

19. The data storage device of claim 11, wherein the controller is configured to translate the write command into multiple internal commands, and wherein a portion of the multiple internal commands is completed prior to expiration of a timeout period associated with the write command.

20. The data storage device of claim 11, wherein the controller and the non-volatile memory are incorporated in one of:
   a removable flash memory card;
   an embedded flash memory; and
   a solid state drive.

* * * * *